US012808481B2

(12) United States Patent
Liu

(10) Patent No.: US 12,808,481 B2
(45) Date of Patent: Nov. 24, 2026

(54) SUPPORT STAND

(71) Applicant: QISDA CORPORATION, Taoyuan City (TW)

(72) Inventor: Yu-Chen Liu, Taipei City (TW)

(73) Assignee: QISDA CORPORATION, Taoyuan City (TW)

( * ) Notice: Subject to any disclaimer, the term of this patent is extended or adjusted under 35 U.S.C. 154(b) by 12 days.

(21) Appl. No.: 19/256,025

(22) Filed: Jun. 30, 2025

(65) Prior Publication Data

US 2026/0078865 A1 Mar. 19, 2026

(30) Foreign Application Priority Data

Sep. 18, 2024 (CN) ......................... 202411301404.4

(51) Int. Cl.
*F16M 11/04* (2006.01)
*F16M 11/10* (2006.01)
*F16M 13/00* (2006.01)

(52) U.S. Cl.
CPC ............ *F16M 13/00* (2013.01); *F16M 11/10* (2013.01); *F16M 2200/08* (2013.01)

(58) Field of Classification Search
CPC ..................... F16M 2200/08; F16M 2200/024
USPC ....................................................... 248/122.1
See application file for complete search history.

(56) References Cited

U.S. PATENT DOCUMENTS 2,374,409 A * 4/1945 Gallagher ............ A47B 23/043 248/456
8,905,362 B2 * 12/2014 Hu ..................... G01R 31/2808 248/185.1
10,890,289 B2 * 1/2021 Tsuji ........................ A47G 1/14
11,546,455 B2 * 1/2023 Kobayashi .............. G06F 1/166
11,629,813 B2 * 4/2023 Holder ................. F16M 11/046 248/685
11,680,428 B2 * 6/2023 Chapuis ................. F16M 11/22 248/551
2014/0305018 A1 * 10/2014 Horanoff ................ F41A 17/04 42/70.11
2014/0328020 A1 * 11/2014 Galant ................... F16M 11/22 361/679.56
2017/0150812 A1 * 6/2017 Tomomatsu ............ H04M 1/04
2020/0088344 A1 * 3/2020 Tsuji ........................ A47G 1/14

(Continued)

FOREIGN PATENT DOCUMENTS

CN 219809657 10/2023
WO 2013/165589 7/2013

*Primary Examiner* — Nkeisha Smith

(74) *Attorney, Agent, or Firm* — Winston Hsu

(57) ABSTRACT

A support stand includes a support base, a connection base connected to an electronic device and pivoted to the support base, a slider, a connection arm, a ratchet, a pawl and a release member. The slider is slidably disposed through a longitudinal slot of the connection base. The connection arm is pivoted to the support base and the slider for slide the slider along the longitudinal slot. The ratchet is pivoted to the slider and engaged with a rack of the connection base. The pawl is pivoted to the slider. The release member slides longitudinally to rotate a linkage arm of the pawl to disengage a stop arm of the pawl from the ratchet or release the linkage arm to drive the stop arm to stop the ratchet for supporting the connection base on the support base. When the connection base pivots upward, the stop arm slides along the ratchet.

18 Claims, 9 Drawing Sheets

(56) References Cited

U.S. PATENT DOCUMENTS

| | | | | |
|---|---|---|---|---|
| 2022/0268401 | A1* | 8/2022 | Zabelin ................ | F16M 11/041 |
| 2026/0078866 | A1* | 3/2026 | Phifer .................. | F16M 11/041 |

* cited by examiner

SUPPORT STAND

BACKGROUND OF THE INVENTION

1. Field of the Invention

The present invention relates to a support stand, and more specifically, to a support stand having a pawl sliding along a ratchet or reversely stopping the ratchet with longitudinal sliding of a slider for support angle adjustment.

2. Description Of The Prior Art

In general, a flat-panel electronic device (e.g., a tablet computer) often utilizes a support stand to rest on a flat surface like a table. In practical applications, for allowing a user to flexibly adjust a support angle of the flat-panel electronic device relative to the support stand, the support stand is usually pivoted to an additional connection base to hold the flat-panel electronic device. Via cooperation of a slider with a gear/rack positioning mechanism inside the connection base, the user can perform segmented angle adjustments of the connection base relative to the support stand, so as to position the flat-panel electronic device at a support angle convenient for viewing or operation.

However, in the prior art utilizing the aforesaid gear/rack positioning mechanism, since there is a backlash between a gear and a rack in the gear/rack positioning mechanism, it may lead to screen wobbling or unstable support when the user operates the flat-panel electronic device resting on the support stand, so as to significantly affect the user experience and handling comfort. Moreover, in the aforesaid design, whether the user wants to increase or reduce the support angle of the connection base, the user must additionally operate a pull handle to release engagement between the gear and the rack, thereby making the support angle adjustment process of the support stand time-consuming, strenuous and less intuitive or user-friendly.

SUMMARY OF THE INVENTION

The present invention provides a support stand suitable for adjusting a placement angle of an electronic device. The support stand includes a support base, a connection base, a slider, a connection arm, a first ratchet, a first pawl, and a release member. The support base has a pivot end portion. The connection base has a first longitudinal slot and a first rack formed along the first longitudinal slot. The connection base is pivotally connected to the pivot end portion to be unfolded or folded relative to the support base and is detachably connected to the electronic device. The slider is slidably disposed through the first longitudinal slot for longitudinally sliding relative to the connection base. The connection arm is pivotally connected between the support base and the slider to slide the slider along the first longitudinal slot with pivoting of the connection base relative to the support base. The first ratchet is rotatably disposed on the slider. The first ratchet has a plurality of first ratchet teeth and is engaged with the first rack. Each first ratchet tooth has a first sliding surface and a first stop surface and is in a non-isosceles triangle shape. The first pawl is rotatably disposed on the slider and has a first stop arm and a first linkage arm. The release member is longitudinally slidable on the connection base and located at a side of the first longitudinal slot. The release member slides longitudinally to pivot the first linkage arm in a first direction for disengaging the first stop arm from the first ratchet, or slides longitudinally to release the first linkage arm to pivot in a second direction opposite the first direction for driving the first stop arm to stop the first ratchet. When the connection base pivots upward relative to the support base to rotate the first ratchet in the second direction along the first rack, the first stop arm slides along the first sliding surface of at least one of the first ratchet teeth. When the connection base stops pivoting and presses the connection arm by gravity to rotate the first ratchet in the first direction, the first stop arm stops the first stop surface for unfolding the connection base on the support base via the connection arm.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
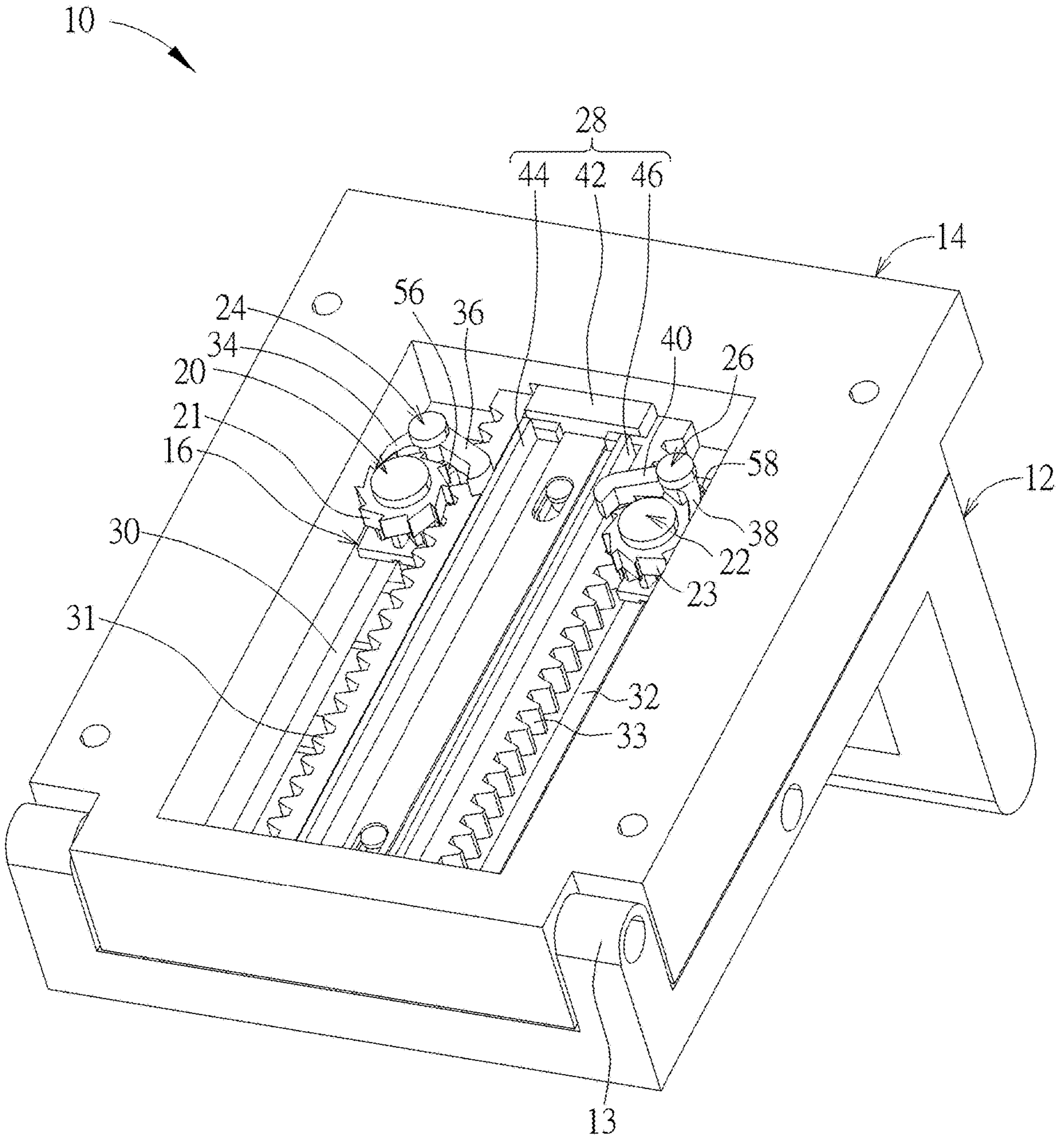
FIG. 1 is a diagram of a support stand according to an embodiment of the present invention.

The present invention will now be described more specifically with reference to the following embodiments and the accompanying drawings. Other advantages and effects of the present invention can be easily understood by a person ordinarily skilled in the art in view of the detailed descriptions and the accompanying drawings. The present invention can be implemented or applied to other different embodiments. Certain aspects of the present invention are not limited by the particular details of the examples illustrated herein. Without departing from the spirit and scope of the present invention, the present invention will have other modifications and changes. It should be understood that the appended drawings are not necessarily drawn to the scale and configuration of each component (e.g., the structural design and size of a support stand) in the drawings is merely illustrative, not presenting an actual condition of the embodiments.

Figure 2:
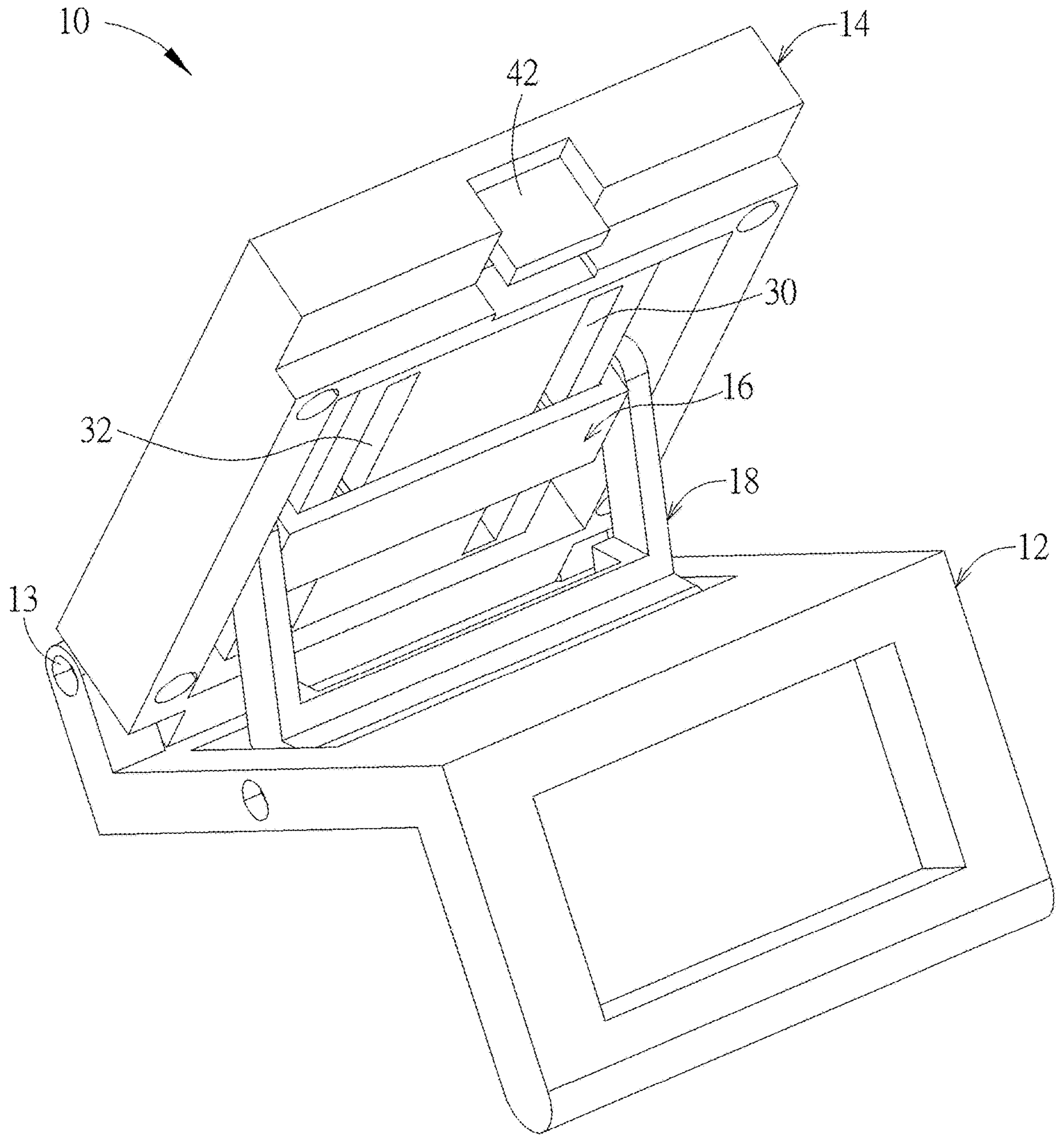
FIG. 2 is a diagram of the support stand at an unfolded state from another viewing angle.
Figure 3:
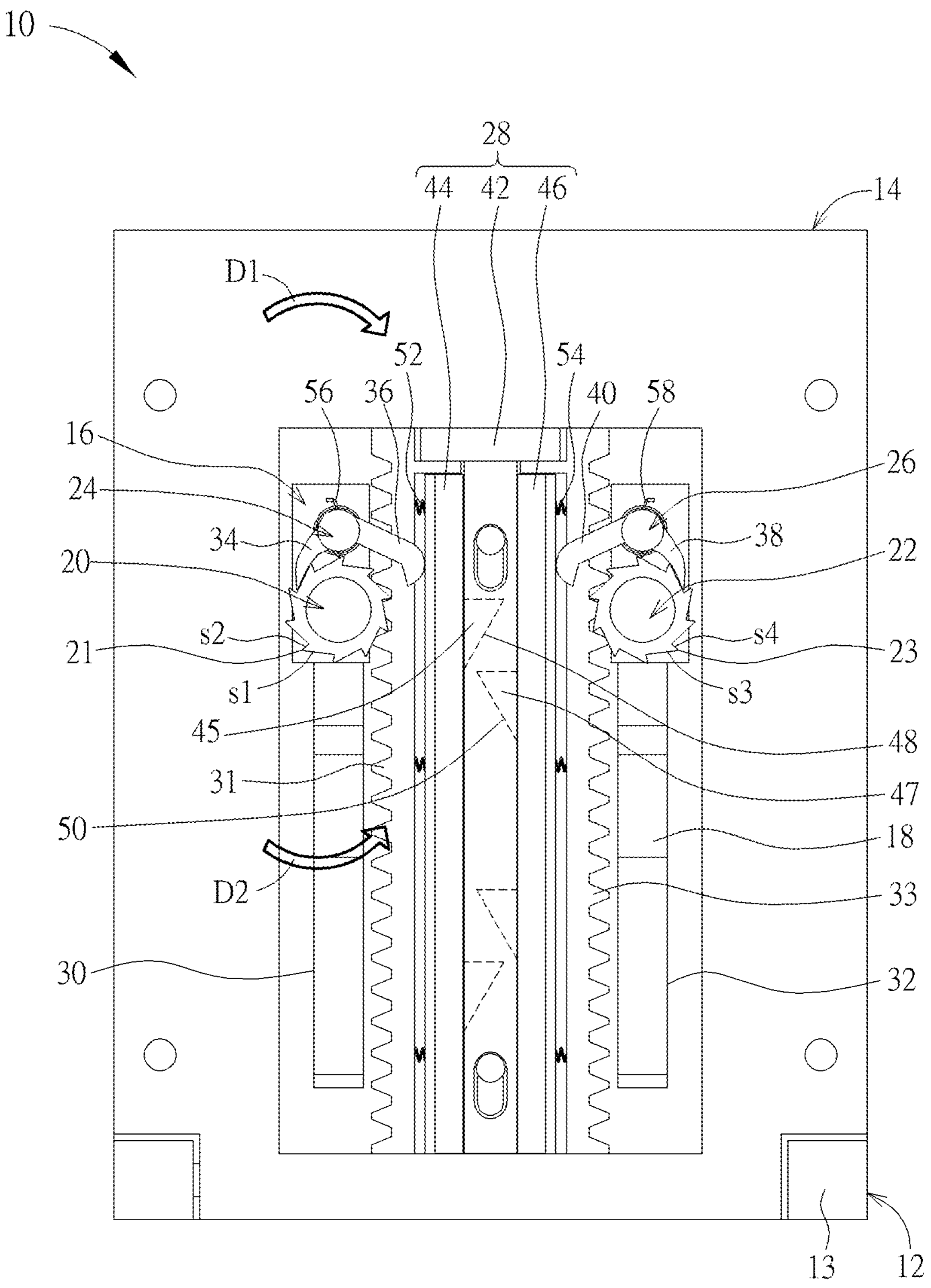
FIG. 3 is a front view of the support stand in FIG. 1.

Please refer to FIGS. 1, 2, and 3. FIG. 1 is a diagram of a support stand 10 according to an embodiment of the present invention. FIG. 2 is a diagram of the support stand 10 at an unfolded state from another viewing angle. FIG. 3 is a front view of the support stand 10 in FIG. 1. The support stand 10 is designed to adjust a placement angle of an electronic device (e.g., a tablet computer or a smartphone). As shown in FIGS. 1-3, the support stand 10 includes a support base 12, a connection base 14, a slider 16, a connection arm 18, a first ratchet 20, a second ratchet 22, a first pawl 24, a second pawl 26, and a release member 28. The support base 12 adopts a conventional base design (as shown in FIGS. 1 and 2, but not limited thereto) commonly used for supporting an electronic device and includes a pivoting end portion 13. The connection base 14 has a first longitudinal slot 30 and a second longitudinal slot 32 and forms a first rack 31 along the first longitudinal slot 30 and a second rack 33 along the second longitudinal slot 32. The connection base 14 is detachably connected to an electronic device that the support stand 10 is intended to support (e.g., by screws, but not limited thereto, meaning that the present invention could adopt other detachable connection design, such as magnetic absorption) and is pivotally connected to the pivoting end portion 13. The slider 16 is slidably disposed through the first longitudinal slot 30 and the second longitudinal slot 32 to be slidable longitudinally relative to the connection base 14. The connection arm 18 is pivotally connected between the support base 12 and the slider 16, for sliding the slider 16 along the first longitudinal slot 30 and the second longitudinal slot 32 together with pivoting of the connection base 14 relative to the support base 12 via the pivot end portion 13. In other words, when the connection base 14 pivots upward relative to the support base 12 via the pivoting end portion 13, the connection arm 18 drives the slider 16 to slide downward along the first longitudinal slot 30 and the second longitudinal slot 32. On the contrary, when the connection base 14 pivots downward, the connection arm 18 drives the slider 16 to slide upward along the first longitudinal slot 30 and the second longitudinal slot 32. Via the aforesaid design, the connection base 14 can be unfolded (as shown in FIG. 2, but not limited thereto) or folded (as shown in FIG. 1) relative to the support base 12, allowing a user to place the electronic device on a flat surface (e.g., a table) and adjust the electronic device to a suitable angle for viewing or operation. As such, it is convenient for the user to perform subsequent operations, such as watching videos played by the electronic device or using the electronic device to perform document editing.

Furthermore, as shown in FIGS. 1-3, the first ratchet 20 is rotatably disposed on the slider 16, and the first ratchet 20 has a plurality of first ratchet teeth 21 and is engaged with the first rack 31 (e.g., a gear structure could be formed under the first ratchet 20 to be engaged with the first rack 31 for allowing the first ratchet 20 to slide along the first rack 31, but not limited thereto). The second ratchet 22 is also rotatably disposed on the slider 16, and the second ratchet 22 has a plurality of second ratchet teeth 23 and is engaged with the second rack 33 (e.g., a gear structure could be formed under the second ratchet 22 to be engaged with the second rack 33 for allowing the second ratchet 22 to slide along the second rack 33, but not limited thereto). The first pawl 24 is rotatably disposed on the slider 16 and has a first stop arm 34 and a first linkage arm 36. The second pawl 26 is rotatably disposed on the slider 16 and has a second stop arm 38 and a second linkage arm 40. Each first ratchet tooth 21 has a first sliding surface s1 and a first stop surface s2 and is in a non-isosceles triangular shape, and each second ratchet tooth 23 has a second sliding surface s3 and a second stop surface s4 and is in a non-isosceles triangular shape, so as to improve the sliding smoothness and engagement stability between the pawls and the ratchets. To be noted, the pawl/ratchet configuration adopted by the present invention is not limited to a dual-sided stop mechanism mentioned in this embodiment. That is, the present invention could adopt a single-sided stop mechanism in another embodiment to simplify the mechanical design of the support stand, and the related description could be reasoned by analogy according to this embodiment and omitted herein.

Via the aforementioned design, when the connection base 14 pivots upward relative to the support base 12 (at this time, the connection arm 18 correspondingly drives the slider 16 downward along the first longitudinal slot 30 and the second longitudinal slot 32), the connection base 14 rotates the first ratchet 20 along the first rack 31 in a second direction D2, and rotates the second ratchet 22 along the second rack 33 in a first direction D1. During this process, the first stop arm 34 slides sequentially along the first sliding surfaces s1 of each first ratchet tooth 21, and the second stop arm 38 slides sequentially along the second sliding surfaces s3 of each second ratchet tooth 23, thereby allowing the user to pull the connection base 14 upward to a suitable support angle as needed. On the other hand, when the connection base 14 stops pivoting and presses the connection arm 18 by gravity to reversely rotate the first ratchet 20 and the second ratchet 22, the first stop arm 34 and the second stop arm 38 respectively stop the first stop surface s2 and the second stop surface s4. In this state, the first ratchet 20 and the second ratchet 22 are engaged with the first pawl 24 and the second pawl 26, thereby preventing further rotation of the first ratchet 20 and the second ratchet 22. This allows the connection base 14 to be securely supported on the support base 12 via the connection arm 18 (for example, in a support state as shown in FIG. 2).

Figure 4:
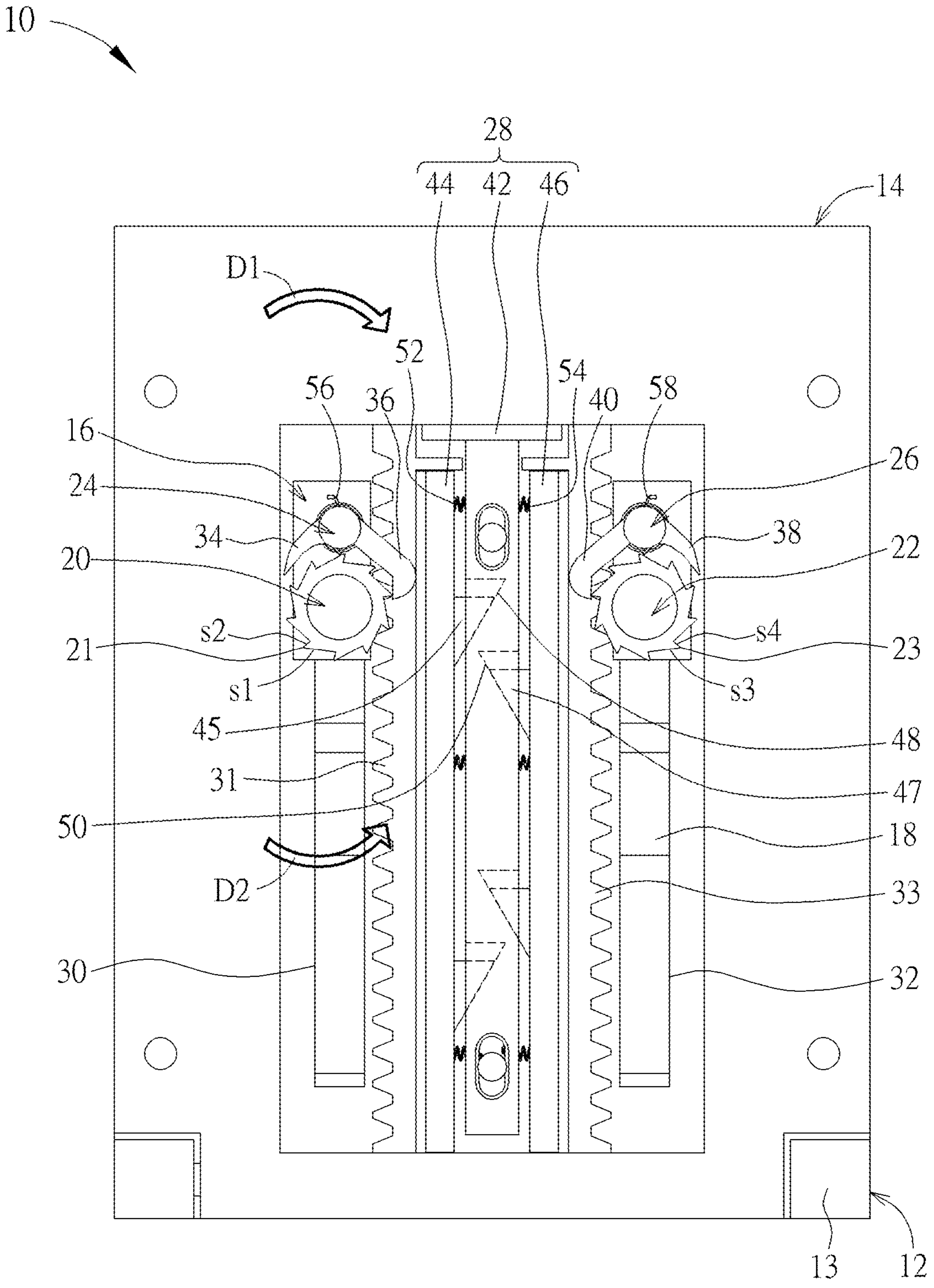
FIG. 4 is a front view of the support stand in FIG. 3 when a release member respectively disengages a first pawl and a second pawl from a first ratchet and a second ratchet.

As for the releasing design of the release member 28, please refer to FIGS. 3 and 4. FIG. 4 is a front view of the support stand 10 in FIG. 3 when the release member 28 respectively disengages the first pawl 24 and the second pawl 26 from the first ratchet 20 and the second ratchet 22. As shown in FIGS. 3 and 4, the release member 28 is longitudinally slidable on the connection base 14 and located between the first longitudinal slot 30 and the second longitudinal slot 32. As such, the release member 28 can slide longitudinally relative to the connection base 14 to respectively pivot the first pawl 24 and the second pawl 26 in the first direction D1 and the second direction D2 for disengaging the first pawl 24 and the second pawl 26 from the first ratchet 20 and the second ratchet 22 (as shown in FIG. 4). This allows the connection base 14 to pivot relative to the support base 12. Alternatively, the release member 28 can slide longitudinally relative to the connection base 14 to release the first pawl 24 and the second pawl 26, such that the first pawl 24 and the second pawl 26 can pivot toward the second direction D2 and the first direction D1, respectively, thereby stopping the first ratchet 20 and the second ratchet 22 (as shown in FIG. 3) to secure the connection base 14 at a support angle on the support base 12.

To be more specific, in this embodiment, the release member 28 could preferably adopt a sloped structural design. For example, as shown in FIGS. 3 and 4, the release member 28 includes a pull handle 42, a first linkage member 44, and a second linkage member 46. The pull handle 42 is longitudinally slidable on the connection base 14 and includes at least one first sloped groove 48 and at least one second sloped groove 50 (in FIGS. 3 and 4, the pull handle 42 is shown with two first sloped grooves 48 and two second sloped grooves 50, but not limited thereto). The first linkage member 44 and the second linkage member 46 are laterally slidable on two sides of the pull handle 42 and abut against the first linkage arm 36 and the second linkage arm 40, respectively. The first linkage member 44 and the second linkage member 46 respectively form a first sloped protrusion 45 cooperated with the first sloped groove 48 and the second sloped protrusion 47 cooperated with the second sloped groove 50. In such a manner, when the pull handle 42 is pulled upward, the first sloped groove 48 and the second sloped groove 50 respectively push the first sloped protrusion 45 and the second sloped protrusion 47 outward (as shown in FIG. 4), so as to drive the first linkage arm 36 and the second linkage arm 40 to pivot toward the first direction D1 and the second direction D2, respectively. As such, the first stop arm 34 and the second stop arm 38 can be respectively disengaged from the first ratchet 20 and the second ratchet 22. This enables the connection base 14 to pivot relative to the support base 12 for subsequent support angle adjustment.

On the other hand, the release member 28 could preferably adopt an elastic returning design. For example, as shown in FIGS. 3 and 4, the release member 28 could include at least one first spring 52 and at least one second spring 54 (in FIGS. 3 and 4, the release member 28 is shown with three first springs 52 and three second springs 54, but not limited thereto). The first spring 52 is connected to the first linkage member 44 and the connection base 14, and the second spring 54 is connected to the second linkage member 46 and the connection base 14. In such a manner, when the pull handle 42 is released, the first spring 52 and the second spring 54 respectively drive the first linkage member 44 and the second linkage member 46 inward from a position shown in FIG. 4 to a position shown in FIG. 3. During the aforesaid process, the first sloped protrusion 45 and the second sloped protrusion 47 can respectively press the first sloped groove 48 and the second sloped groove 50 to slide downward, for driving the pull handle 42 downward, thereby achieving the automatic handle returning effect. Additionally, the support stand 10 could include a first torsion spring 56 and a second torsion spring 58. The first torsion spring 56 is connected to the first pawl 24 and the slider 16, and the second torsion spring 58 is connected to the second pawl 26 and the slider 16. As such, the first torsion spring 56 and the second torsion spring 58 can provide elastic forces to drive the first pawl 24 and the second pawl 26 back to their initial positions for stopping the first ratchet 20 and the second ratchet 22, so as to secure the connection base 14 at a support angle on the support base 12.

Figure 5:
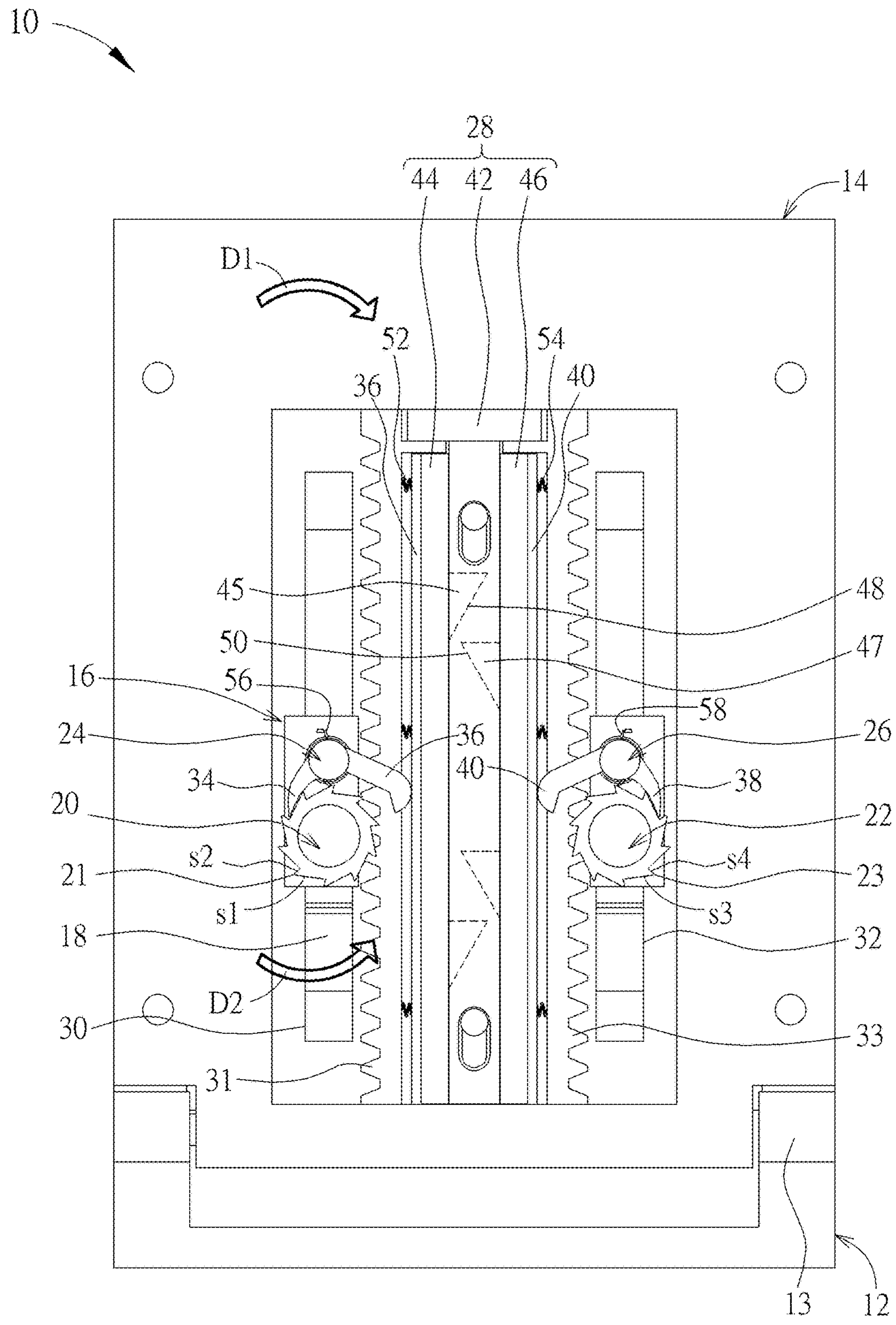
FIG. 5 is a front view of the support stand in FIG. 2.
Figure 6:
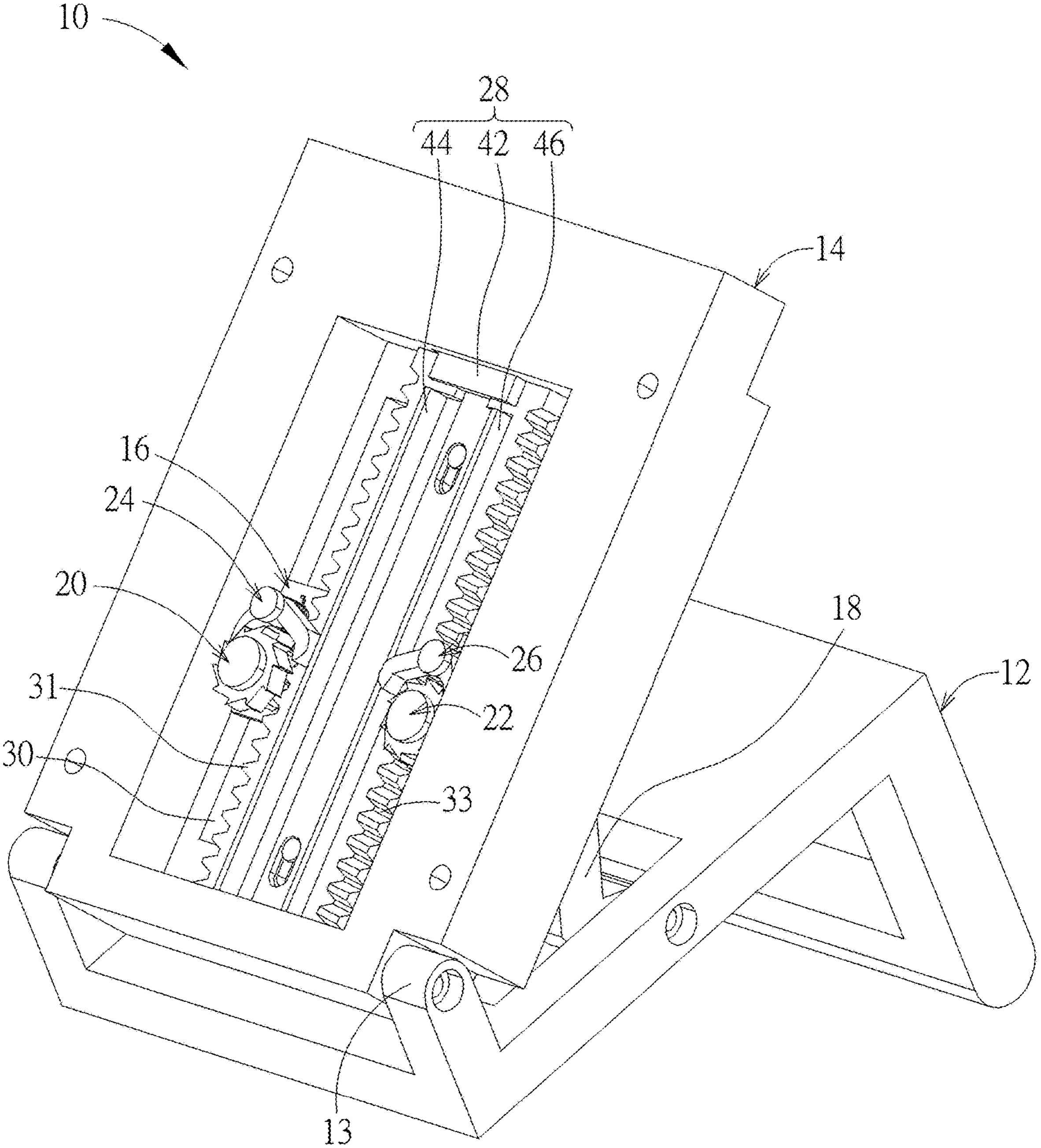
FIG. 6 is a diagram of the support stand in FIG. 5.

More detailed description for the support angle adjustment operation of the support stand 10 is provided as follows. Please refer to FIGS. 1-6. FIG. 5 is a front view of the support stand 10 in FIG. 2. FIG. 6 is a diagram of the support stand 10 in FIG. 5. Via the aforementioned design, when the user wants to adjust a support angle of an electronic device mounted on the connection base 14 (not shown in the figures), the user just needs to pivot the connection base 14 upward as shown in FIG. 1 until the connection base 14 pivots to a desired support angle relative to the support base 12 via the pivoting end portion 13. For example, the user could pull the connection base 14 upward from a folded position as shown in FIG. 1 to an unfolded position as shown in FIG. 6. At the same time, with pivoting of the connection base 14 relative to the support base 12, the connection arm 18 drives the slider 16 to slide longitudinally along the first longitudinal slot 30 and the second longitudinal slot 32 from a position as shown in FIG. 1 to a position as shown in FIG. 6. During this process, the first ratchet 20 rotates along the first rack 31 in the second direction D2, and the second ratchet 22 rotates along the second rack 33 in the first direction D1. As such, the first stop arm 34 and the second stop arm 38 can slide along the first sliding surfaces s1 of the first ratchet teeth 21 and the third sliding surfaces s3 of the second ratchet teeth 23, respectively, for ensuring smooth longitudinal movement of the slider 16 on the connection base 14. This enhances the operational feel of the support stand 10 and achieves the stepless angle adjustment effect.

After the aforesaid support angle adjustment operation is completed, the user can stop pulling the connection base 14 upward. At the same time, the connection base 14 stops pivoting and presses the connection arm 18 via gravity to respectively rotate the first ratchet 20 and the second ratchet 22 in the first direction D1 and the second direction D2. As such, the first stop arm 34 and the second stop arm 38 can respectively stop the first stop surface s2 and the second stop surface s4 (as shown in FIG. 5), so as to support the connection base 14 on the support base 12 steadily via the connection arm 18 (as shown in FIG. 6), thereby allowing the user to perform subsequent operations, such as watching videos played by the electronic device or using the electronic device to perform document editing. To be noted, if the user wants to further increase the support angle of the connection base 14 as shown in FIG. 6, the user can continue pulling the connection base 14 upward to a desired support angle. As for the corresponding ratchet/pawl mechanical relationship, the related description could be reasoned by analogy according to FIGS. 3 and 5 and omitted herein.

On the contrary, if the user wants to reduce the support angle of the connection base 14 as shown in FIG. 6, the user just needs to pull the pull handle 42 upward for releasing engagement of the first stop arm 34 with the first stop surface s2 via the first linkage member 44 and releasing engagement of the second stop arm 38 with the second stop surface s4 via the second linkage member 46 (the related description could be reasoned by analogy according to FIGS. 3 and 4 and omitted herein). As such, the slider 16 can slide upward along the first longitudinal slot 30 and the second longitudinal slot 32 from a position shown in FIG. 5 until the connection base 14 pivots downward to a reduced support angle. Subsequently, the user can stop pulling the pull handle 42 upward. In such a manner, as mentioned above, when the pull handle 42 is released, the pull handle 42 can automatically return to its original position together with the first pawl 24 and the second pawl 26 (the related description could be reasoned by analogy according to FIGS. 3 and 4 and omitted herein), so that the connection base 14 can be securely supported on the support base 12 at the reduced support angle via engagement of the first pawl 24 with the first ratchet 20 and via engagement of the second pawl 26 with the second ratchet 22.

In summary, compared with the prior art adopting the gear/rack mechanical design, the present invention utilizes the support angle adjustment design in which the pawl slides along the ratchet or reversely stops the ratchet with longitudinal movement of the slider. This design allows a user to pull the connection base upward to increase the support angle or pull the release member to reduce the support angle. In such a manner, the present invention can effectively solve the prior art problems, such as screen wobbling or instability caused by the backlash between the gear and the rack, and the time-consuming, strenuous and unintuitive angle adjustment process. Thus, the present invention significantly improves the operational convenience of the support stand in support angle adjustment.

Figure 7:
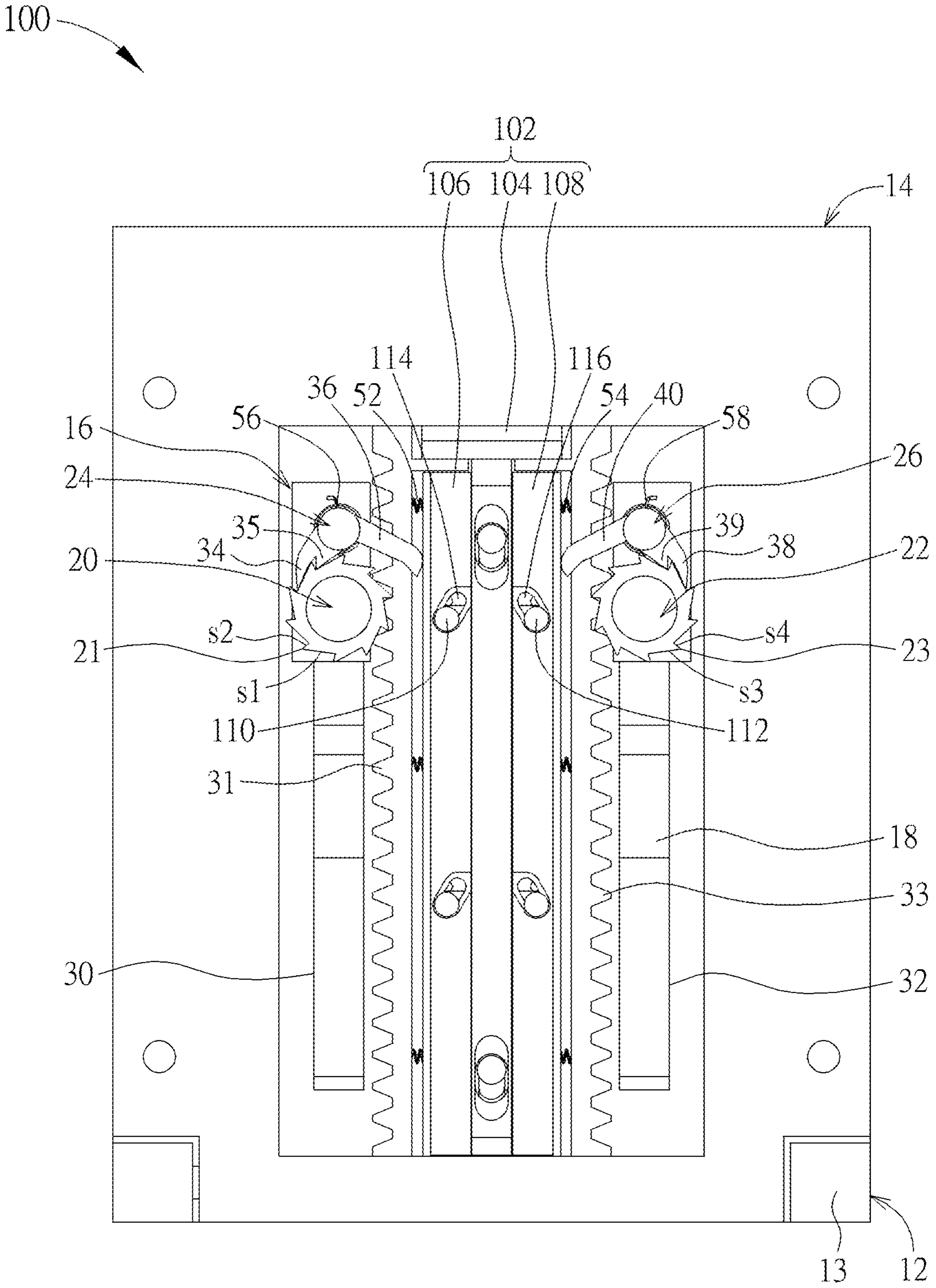
FIG. 7 is a front view of a support stand according to another embodiment of the present invention.
Figure 8:
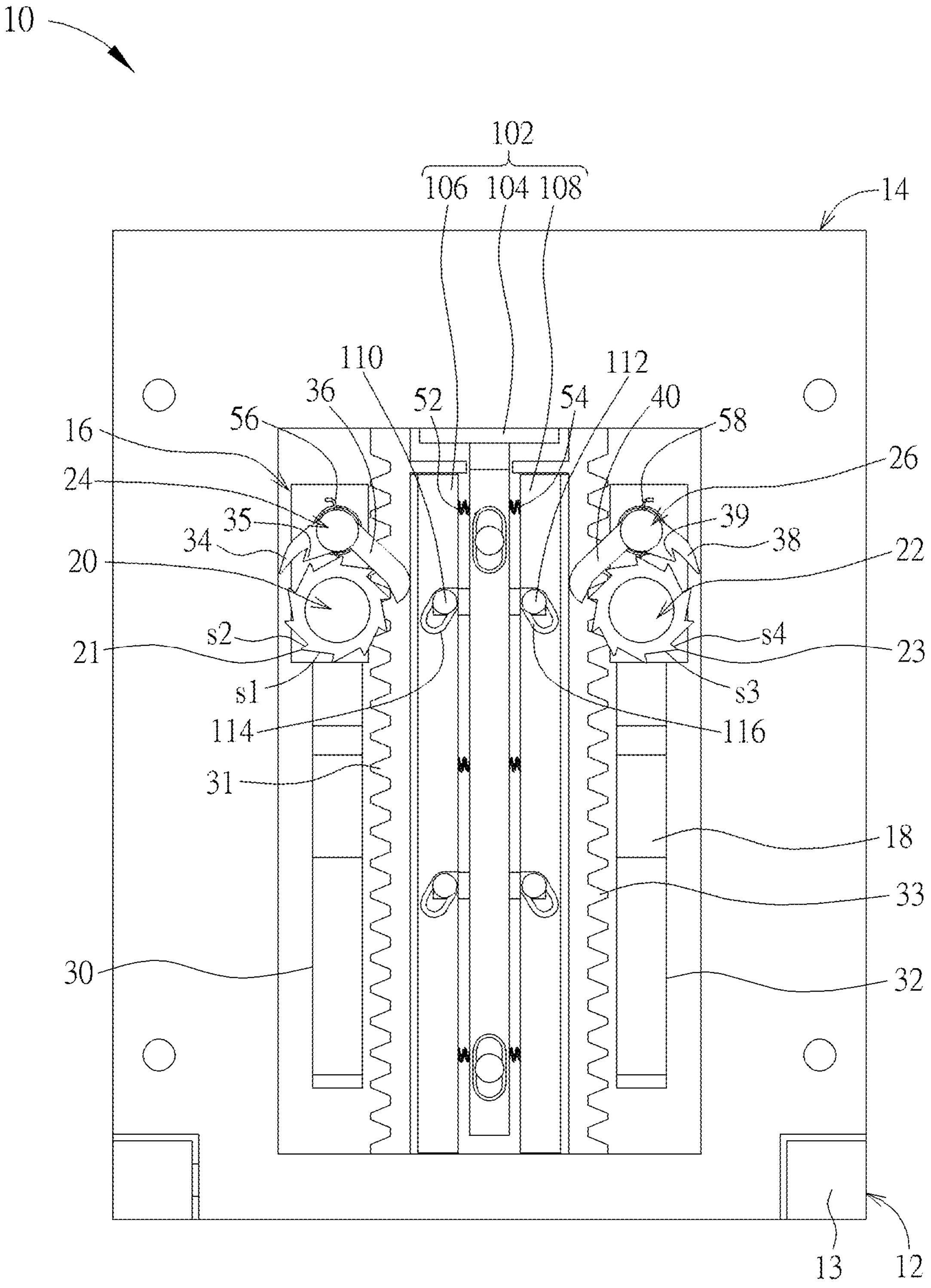
FIG. 8 is a front view of the support stand in FIG. 7 when a release member respectively disengages the first pawl and the second pawl from the first ratchet and the second ratchet.

It should be mentioned that the releasing mechanical design of the present invention is not limited to the aforesaid embodiment. The present invention could adopt a sloped slot design. For example, please refer to FIGS. 7 and 8. FIG. 7 is a front view of a support stand 100 according to another embodiment of the present invention. FIG. 8 is a front view of the support stand 100 in FIG. 7 when the release member 102 respectively disengages the first pawl 24 and the second pawl 26 from the first ratchet 20 and the second ratchet 22. Components both mentioned in this embodiment and the aforesaid embodiments represent components with similar structures or functions, and the related description could be reasoned by analogy according to the aforesaid embodiments and omitted herein. As shown in FIGS. 7 and 8, the support stand 100 includes the support base 12, the connection base 14, the slider 16, the connection arm 18, the first ratchet 20, the second ratchet 22, the first pawl 24, the second pawl 26, and a release member 102. The release member 102 is longitudinally slidable on the connection base 14 and located between the first longitudinal slot 30 and the second longitudinal slot 32. The release member 102 includes a pull handle 104, a first linkage member 106, and a second linkage member 108. The pull handle 104 is longitudinally slidable on the connection base 14 and has at least one first pillar 110 and at least one second pillar 112 (in FIGS. 7 and 8, the pull handle 104 is shown with two first pillars 110 and two second pillars 112, but not limited thereto). The first linkage member 106 and the second linkage member 108 are laterally slidable on two sides of the pull handle 104 and abut against the first linkage arm 36 and the second linkage arm 40, respectively. The first linkage member 106 and the second linkage member 108 respectively form a first sloped slot 114 receiving the first pillar 110 and a second sloped slot 116 receiving the second pillar 112.

In such a manner, when the pull handle 104 is pulled upward, the first pillar 110 and the second pillar 112 slide along the first sloped slot 114 and the second sloped slot 116, respectively, thereby driving the first linkage member 106 and the second linkage member 108 outward, so as to pivot the first linkage arm 36 and the second linkage arm 40. As such, the first stop arm 34 and the second stop arm 38 can be disengaged from the first ratchet 20 and the second ratchet 22 (as shown in FIG. 8). This allows the connection base 14 to pivot relative to the support base 12 for subsequent support angle adjustment. On the other hand, when the pull handle 104 is released, the first spring 52 and the second spring 54 drive the first linkage member 106 and the second linkage member 108 inward from a position shown in FIG. 8 to a position shown in FIG. 7. Accordingly, the first sloped slot 114 and the second sloped slot 116 can respectively press the first pillar 110 and the second pillar 112 to slide downward, for driving the pull handle 104 downward to achieve the automatic handle returning effect. Simultaneously, the first torsion spring 56 and the second torsion spring 58 provide elastic forces to drive the first pawl 24 and the second pawl 26 back to their original positions for stopping the first ratchet 20 and the second ratchet 22. As a result, the connection base 14 can be secured at an adjusted support angle on the support base 12.

In practical applications, as shown in FIG. 7, the first pawl 24 could further have at least one first reinforcing arm 35 extending from the first stop arm 34 (one shown in FIG. 7, but not limited thereto), and the second pawl 26 could further have at least one second reinforcing arm 39 extending from the second stop arm 38 (one shown in FIG. 7, but not limited thereto). As such, when the connection base 14 pivots upward relative to the support base 12 to rotate the first ratchet 20 and the second ratchet 22, the first reinforcing arm 35 and the second reinforcing arm 39 slide along the first ratchet 20 and the second ratchet 22, respectively. On the other hand, when the first ratchet 20 and the second ratchet 22 rotate reversely, the first stop arm 34 and the first reinforcing arm 35 stop the first ratchet 20, and the second stop arm 38 and the second reinforcing arm 39 stop the second ratchet 22, so as to support the connection base 14 on the support base 12 more steadily. The aforesaid reinforcing arm design could be applied to other embodiments of the present invention, and the related description could be reasoned by analogy according to FIGS. 7 and 8 and omitted herein.

Figure 9:
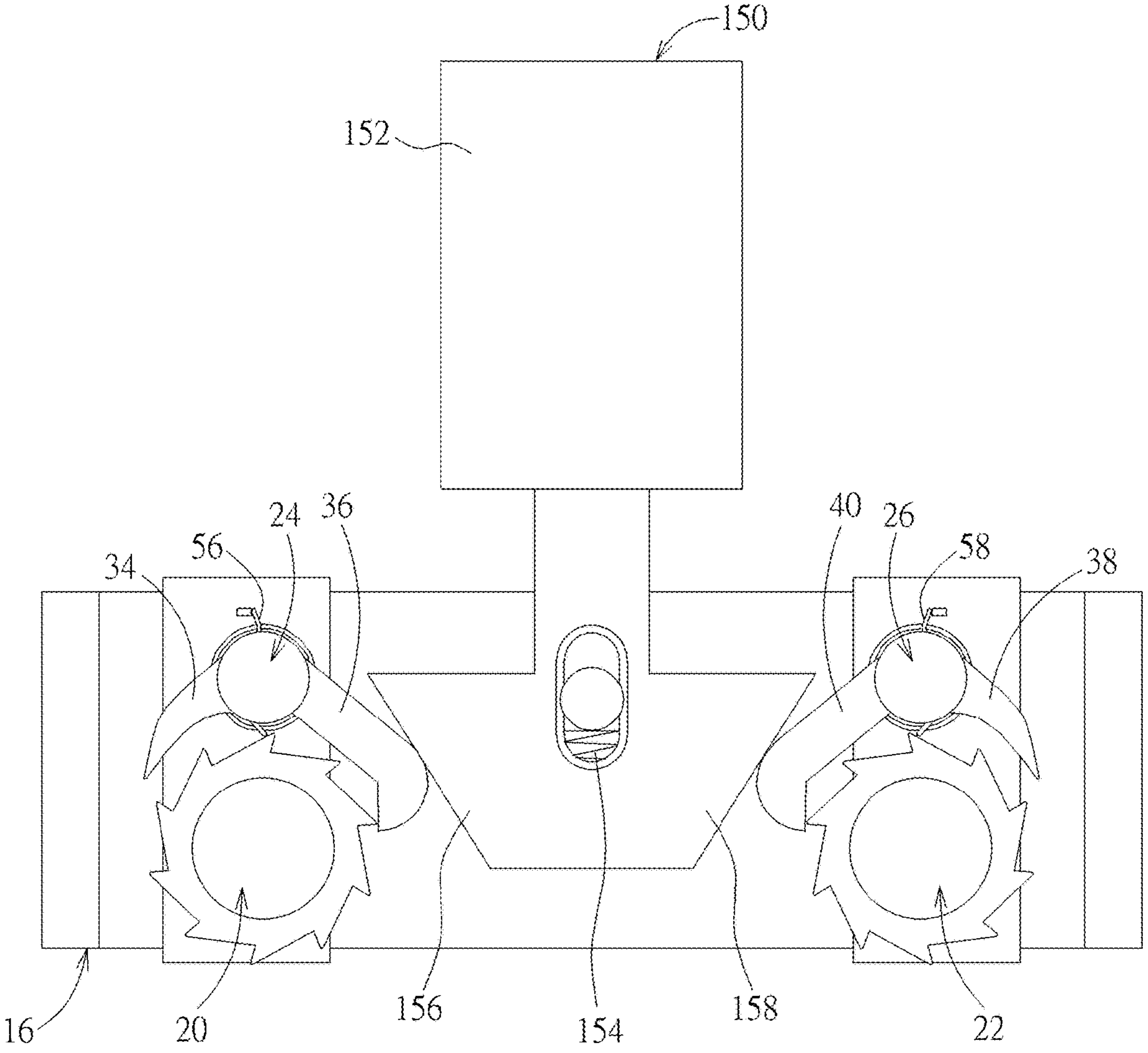
FIG. 9 is a front view of a release member disengaging the first pawl and the second pawl on the slider from the first ratchet and the second ratchet, respectively, according to another embodiment of the present invention.

In addition, the present invention could adopt a button releasing design. For example, refer to FIG. 9, which is a front view of a release member 150 disengaging the first pawl 24 and the second pawl 26 on the slider 16 from the first ratchet 20 and the second ratchet 22, respectively, according to another embodiment of the present invention. Components both mentioned in this embodiment and the aforesaid embodiments represent components with similar structures or functions, and the related description could be reasoned by analogy according to the aforesaid embodiments and omitted herein. As shown in FIG. 9, the release member 150 includes a button 152 and a spring 154. The button 152 is longitudinally slidable on the connection base 14 (not shown in the figure) and has a first sloped protrusion 156 and a second sloped protrusion 158 respectively abutting against the first linkage arm 36 and the second linkage arm 40. The spring 154 is connected to the button 152 and the connection base 14 for returning the button 152 to its original position.

Via the aforesaid design, when the button 152 is pressed, the first sloped protrusion 156 and the second sloped protrusion 158 press the first linkage arm 36 and the second linkage arm 40 downward, respectively, for disengaging the first stop arm 34 and the second stop arm 38 from the first ratchet 20 and the second ratchet 22 (as shown in FIG. 9). This allows the connection base 14 to pivot relative to the support base 12 for subsequent support angle adjustment. On the other hand, when the button 152 is released, the spring 154 drives the button 152 upward to its original position, causing the first sloped protrusion 156 and the second sloped protrusion 158 to stop pressing the first linkage arm 36 and the second linkage arm 40. Simultaneously, the first torsion spring 56 and the second torsion spring 58 provide elastic forces to drive the first pawl 24 and the second pawl 26 back to their original positions for stopping the first ratchet 20 and the second ratchet 22, so as to securely fix the connection base 14 at an adjusted support angle on the support base 12.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A support stand suitable for adjusting a placement angle of an electronic device, the support stand comprising:

a support base having a pivot end portion;

a connection base having a first longitudinal slot and a first rack formed along the first longitudinal slot, the connection base being pivotally connected to the pivot end portion to be unfolded or folded relative to the support base and being detachably connected to the electronic device;

a slider slidably disposed through the first longitudinal slot for longitudinally sliding relative to the connection base;

a connection arm pivotally connected between the support base and the slider to slide the slider along the first longitudinal slot with pivoting of the connection base relative to the support base;

a first ratchet rotatably disposed on the slider, the first ratchet having a plurality of first ratchet teeth and being engaged with the first rack, and each first ratchet tooth having a first sliding surface and a first stop surface and being in a non-isosceles triangle shape;

a first pawl rotatably disposed on the slider and having a first stop arm and a first linkage arm; and a release member longitudinally slidable on the connection base and located at a side of the first longitudinal slot, the release member sliding longitudinally to pivot the first linkage arm in a first direction for disengaging the first stop arm from the first ratchet, or sliding longitudinally to release the first linkage arm to pivot in a second direction opposite the first direction for driving the first stop arm to stop the first ratchet;

wherein when the connection base pivots upward relative to the support base to rotate the first ratchet in the second direction along the first rack, the first stop arm slides along the first sliding surface of at least one of the first ratchet teeth;

when the connection base stops pivoting and presses the connection arm by gravity to rotate the first ratchet in the first direction, the first stop arm stops the first stop surface for unfolding the connection base on the support base via the connection arm.

2. The support stand of claim 1, wherein the release member comprises:

a pull handle longitudinally slidable on the connection base and having at least one sloped groove; and a linkage member laterally slidable on a side of the pull handle and abutting against the first linkage arm, a sloped protrusion protruding from the linkage member for slidably cooperating with the at least one sloped groove;

wherein when the pull handle is pulled, the at least one sloped groove pushes the sloped protrusion outward to pivot the first linkage arm in the first direction for disengaging the first stop arm from the first ratchet.

3. The support stand of claim 2, wherein the release member further comprises:

at least one spring connected to the linkage member and the connection base;

wherein when the pull handle is released, the at least one spring slides the linkage member inward to make the sloped protrusion slide downward along the at least one sloped groove for returning the pull handle to its original position.

4. The support stand of claim 1, wherein the release member comprises:

a pull handle longitudinally slidable on the connection base and having at least one pillar; and a linkage member laterally slidable on a side of the pull handle and abutting against the first linkage arm, a sloped slot being formed on the linkage member for receiving the at least one pillar;

wherein when the pull handle is pulled, the at least one pillar slides along the sloped slot to drive the linkage member outward for pivoting the first linkage arm in the first direction to disengage the first stop arm from the first ratchet.

5. The support stand of claim 4, wherein the release member further comprises:

at least one spring connected to the linkage member and the connection base;

wherein when the pull handle is released, the at least one spring slides the linkage member inward to slide the sloped slot downward against the at least one pillar for returning the pull handle to its original position.

6. The support stand of claim 1, wherein the release member comprises:

a button longitudinally slidable on the connection base and having a sloped protrusion against the first linkage arm;

wherein when the button is pressed, the sloped protrusion presses the first linkage arm to pivot in the first direction, for disengaging the first stop arm from the first ratchet.

7. The support stand of claim 6, wherein the release member comprises:

a spring connected to the button and the connection base, for returning the button to its original position.

8. The support stand of claim 1, wherein the support stand further comprises:

a torsion spring connected the first pawl and the slider, for returning the first linkage arm to its original position in the second direction.

9. The support stand of claim 1, wherein the first pawl further has at least one reinforcing arm extending from the first stop arm; when the connection base pivots upward relative to the support base to rotate the first ratchet in the second direction along the first rack, the at least one reinforcing arm slides along the first ratchet; when the first ratchet rotates in the first direction, the first stop arm and the at least one reinforcing arm respectively stop the first ratchet, for unfolding the connection base on the support base via the connection arm.

10. The support stand of claim 1, wherein the connection base further has a second longitudinal slot and a second rack formed along the second longitudinal slot, the release member is located between the first longitudinal slot and the second longitudinal slot, the slider is slidably disposed through the second longitudinal slot, the connection arm slides the slider along the first longitudinal slot and the second longitudinal slot with pivoting of the connection base relative to the support base, and the support stand further comprises:

a second ratchet rotatably disposed on the slider, the second ratchet having a plurality of second ratchet teeth and being engaged with the second rack, and each second ratchet tooth having a second sliding surface and a second stop surface and being in a non-isosceles triangle shape; and a second pawl rotatably disposed on the slider and having a second stop arm and a second linkage arm;

wherein the release member slides longitudinally, the release member pivots the second linkage arm in the second direction to disengage the second stop arm from the second ratchet, or releases the second linkage arm to pivot in the first direction for driving the second stop arm to stop the second ratchet;

when the connection base pivots upward relative to the support base to rotate the second ratchet in the first direction along the second rack, the second stop arm slides along the second sliding surface of at least one of the second ratchet teeth;

when the connection base stops pivoting and presses the connection arm by gravity to rotate the second ratchet in the second direction, the second stop arm stops the second stop surface for unfolding the connection base on the support base via the connection arm.

11. The support stand of claim 10, wherein the release member comprises:

a pull handle longitudinally slidable on the connection base and having at least one first sloped groove and at least one second sloped groove;

a first linkage member laterally slidable on a side of the pull handle and abutting against the first linkage arm, a first sloped protrusion protruding from the first linkage member for slidably cooperating with the at least one first sloped groove; and a second linkage member laterally slidable on another side of the pull handle and abutting against the second linkage arm, a second sloped protrusion protruding from the second linkage member for slidably cooperating with the at least one second sloped groove;

wherein when the pull handle is pulled, the at least one first sloped groove pushes the first sloped protrusion outward to pivot the first linkage arm in the first direction for disengaging the first stop arm from the first ratchet, and the at least one second sloped groove pushes the second sloped protrusion outward to pivot the second linkage arm in the second direction for disengaging the second stop arm from the second ratchet.

12. The support stand of claim 11, wherein the release member further comprises:

at least one first spring connected to the first linkage member and the connection base; and at least one second spring connected to the second linkage member and the connection base;

wherein when the pull handle is released, the at least one first spring slides the first linkage member inward and the at least one second spring slides the second linkage member inward, to make the first sloped protrusion slide downward along the at least one first sloped groove and make the second sloped protrusion slide downward along the at least one second sloped groove, for returning the pull handle to its original position.

13. The support stand of claim 10, wherein the release member comprises:

a pull handle longitudinally slidable on the connection base and having at least one first pillar and at least one second pillar;

a first linkage member laterally slidable on a side of the pull handle and abutting against the first linkage arm, a first sloped slot being formed on the first linkage member for receiving the at least one first pillar;

a second linkage member laterally slidable on another side of the pull handle and abutting against the second linkage arm, a second sloped slot being formed on the second linkage member for receiving the at least one second pillar;

wherein when the pull handle is pulled, the at least one first pillar slides along the first sloped slot to drive the first linkage member outward for pivoting the first linkage arm in the first direction, and the at least one second pillar slides along the second sloped slot to drive the second linkage member outward for pivoting the second linkage arm in the second direction, to respectively disengage the first stop arm and the second stop arm from the first ratchet and the second ratchet.

14. The support stand of claim 13, wherein the release member further comprises:

at least one first spring connected to the first linkage member and the connection base; and at least one second spring connected to the second linkage member and the connection base;

wherein when the pull handle is released, the at least one first spring slides the first linkage member inward to slide the first sloped slot downward against the at least one first pillar, and the at least one second spring slides the second linkage member inward to slide the second sloped slot downward against the at least one second pillar, for returning the pull handle to its original position.

15. The support stand of claim 10, wherein the release member comprises:

a button longitudinally slidable on the connection base and having a first sloped protrusion against the first linkage arm and a second sloped protrusion against the second linkage arm;

wherein when the button is pressed, the first sloped protrusion presses the first linkage arm to pivot, and the second sloped protrusion presses the second linkage arm to pivot, for respectively disengaging the first stop arm and the second stop arm from the first ratchet and the second ratchet.

16. The support stand of claim 15, wherein the release member comprises:

a spring connected to the button and the connection base, for returning the button to its original position.

17. The support stand of claim 10, wherein the support stand further comprises:

a first torsion spring connected the first pawl and the slider, for returning the first linkage arm to its original position in the second direction; and a second torsion spring connected the second pawl and the slider, for returning the second linkage arm to its original position in the first direction.

18. The support stand of claim 10, wherein the first pawl further has at least one first reinforcing arm extending from the first stop arm, and the second pawl further has at least one second reinforcing arm extending from the second stop arm; when the connection base pivots upward relative to the support base to rotate the first ratchet in the second direction and rotate the second ratchet in the first direction, the at least one first reinforcing arm slides along the first ratchet and the at least one second reinforcing arm slides along the second ratchet; when the first ratchet rotates in the first direction and the second ratchet rotates in the second direction, the first stop arm and the at least one first reinforcing arm respectively stop the first ratchet, and the second stop arm and the at least one second reinforcing arm respectively stop the second ratchet, for unfolding the connection base on the support base via the connection arm.

* * * * *